United States Patent
Keung Chan et al.

(10) Patent No.: US 9,336,361 B2
(45) Date of Patent: May 10, 2016

(54) FEATURE LICENSE-RELATED REPAIR/REPLACEMENT PROCESSES AND CREDIT HANDLING

(71) Applicant: General Instrument Corporation, Horsham, PA (US)

(72) Inventors: Tat Keung Chan, San Diego, CA (US); Paul D Baker, San Diego, CA (US); Christopher P Gardner, San Diego, CA (US); Xin Qiu, San Diego, CA (US); Jinsong Zheng, San Diego, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 277 days.

(21) Appl. No.: 13/831,428

(22) Filed: Mar. 14, 2013

(65) Prior Publication Data

US 2014/0280828 A1 Sep. 18, 2014

(51) Int. Cl.
*H04L 12/24* (2006.01)
*G06F 21/10* (2013.01)
*G06Q 30/06* (2012.01)

(52) U.S. Cl.
CPC ............. *G06F 21/10* (2013.01); *G06Q 30/06* (2013.01)

(58) Field of Classification Search
CPC ................ H04L 41/0213; H04L 29/08072; H04L 29/06
USPC .......................................................... 709/223
See application file for complete search history.

(56) References Cited

U.S. PATENT DOCUMENTS

| | | | |
|---|---|---|---|
| 7,603,318 B1 * | 10/2009 | Colosso et al. | 705/59 |
| 2002/0083003 A1 | 6/2002 | Halliday et al. | |
| 2003/0126033 A1 | 7/2003 | Evans et al. | |
| 2004/0255115 A1 | 12/2004 | Demello et al. | |
| 2005/0021995 A1 * | 1/2005 | Lal et al. | 713/200 |
| 2006/0106726 A1 * | 5/2006 | Raley et al. | 705/59 |
| 2006/0294580 A1 * | 12/2006 | Yeh | 726/3 |
| 2007/0079121 A1 * | 4/2007 | Sekiguchi et al. | 713/168 |
| 2008/0189213 A1 * | 8/2008 | Blake et al. | 705/59 |
| 2011/0196793 A1 * | 8/2011 | Zheng et al. | 705/50 |
| 2012/0066514 A1 | 3/2012 | Tan, Jr. | |
| 2012/0204269 A1 | 8/2012 | Gardner et al. | |

OTHER PUBLICATIONS

PCT Search Report & Written Opinion, RE: Application #PCT/US14/19786; dated Nov. 6, 2014.

* cited by examiner

*Primary Examiner* — Nicholas Taylor
*Assistant Examiner* — Chong G Kim
(74) *Attorney, Agent, or Firm* — Thomas A. Ward

(57) ABSTRACT

A system and method for issuing a license for a device through a license server is provided. A server receives identification information for a device that communicates to the server if a first license binding identity and/or a first display identity has changed. A previous license for the device is revoked and a previous license credit is returned to a user's credit pool if the first license binding identity and/or the first display identity has changed. A license request is received, which includes a second license binding identity identifying the device. If the second license binding identity is the same as the first license binding identity, the previous license for the device is issued. If the second license binding identity is not the same as the first license binding identity, a new license for the device is issued and a new license credit is deducted from the user's credit pool.

20 Claims, 8 Drawing Sheets

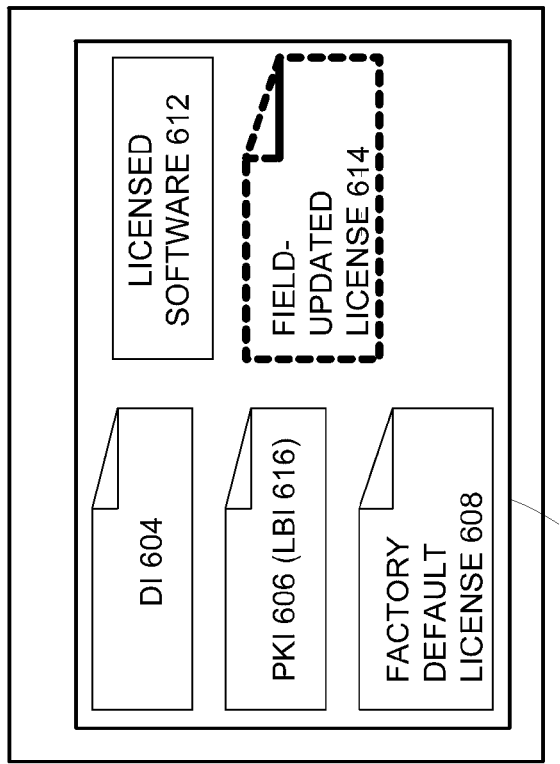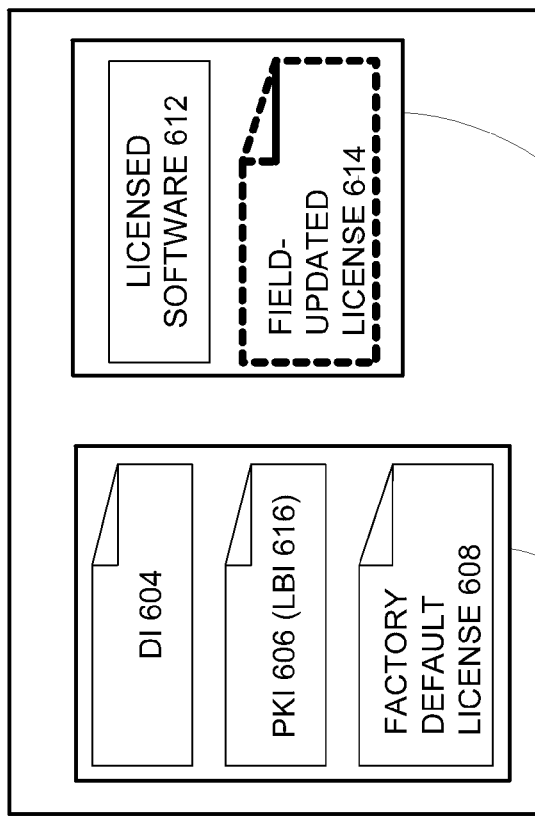
FIG. 6

FEATURE LICENSE-RELATED REPAIR/REPLACEMENT PROCESSES AND CREDIT HANDLING

BACKGROUND OF THE INVENTION

The present invention relates generally to systems and methods for issuing a license, and in particular, to systems and methods for issuing software feature licenses for repaired and/or replaced products and devices.

SUMMARY OF THE INVENTION

The invention provided herein has a number of embodiments useful, for example, in facilitating the repair of a service provider/operator client device and maintaining the association of the client device with keyed software capabilities as granted by the device manufacture under a license. According to one or more embodiments of the present invention, methods and systems are provided for handling the issuance of a license for a device within various device repair and/or replacement scenarios and within licensing ecosystem capabilities.

In one aspect of the invention, a method for issuing a license for a device through a license server is provided. A license server receives identification information for a device. The identification information communicates to the license server if at least one of a first license binding identity identifying the device and a first display identity (e.g. a device serial number) mapped to the first license binding identity has changed. A previous license for the device is revoked and a previous license credit is returned to a user's credit pool if at least one of the first license binding identity and the first display identity has changed.

A license request is received, the license request including a second license binding identity identifying the device. It is determined if the second license binding identity is the same as first license binding identity. If the second license binding identity is the same as the first license binding identity, the previous license for the device is issued. If the second license binding identity is not the same as the first license binding identity, a new license for the device is issued and a new license credit is deducted from the user's credit pool. The first license binding identity is also updated with the second license binding identity when a new license is issued for the device.

In one or more embodiments, a first display identity is mapped to the first license binding identity and a second display identity is mapped to the second license binding identity. In certain instances, a new license for the device is issued and a new license credit from the user's credit pool is deducted if the second license binding identity is not the same as the first license binding identity but the second display identity is the same as the first display identity. In other instances, for example when the device is replaced rather than repaired, the previous license for the device is revoked and the previous license credit is returned to the user's credit pool if both the first license binding identity and the first display identity have changed. Furthermore, a new license for the device is issued and a new license credit from the user's credit pool is deducted if the second license binding identity is not the same as the first license binding identity and the second display identity is also not the same as the first display identity.

In certain embodiments, a license request is received from the device if the previous license loaded on the device is corrupted. In other embodiments, a license request is received from the device if a license template that the device downloads from a license proxy server contains a different set of features from that enabled by the license loaded on the device. The previous license enables a first set of features on the device and the new license enables a second set of features on the device. In situations where the first set of features is the same as the second set of features, the previous license credit returned to the user's credit pool is the same as the new license credit deducted from the user's credit pool. In situations where the first set of features is different from the second set of features, the previous license credit returned to the user's credit pool is different from the new license credit deducted from the user's credit pool.

BRIEF DESCRIPTION OF THE DRAWINGS

Referring now to the drawings in which like reference numbers represent corresponding parts throughout:

FIG. 6 is a diagram illustrating license-related components in an exemplary implementation of the invention;

DETAILED DESCRIPTION OF THE INVENTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Field License Upgrade Process

To enable software feature licensing, a product or device may have software code that implements features that are not enabled by default. In certain situations, to enable a specific feature, a user (e.g. service provider, operator, customer) may have to pay an additional fee to the product/device manufacturer, which is then converted to feature or license credits in the licensing system. The user may then request a software license from the licensing system with the specific feature enabled by consuming the required license credits.

In such a licensing system, a device comprises various digital and identification information that is related to licensing. This may include, but is not limited to, a display identity (DI), a license binding identity (LBI), a factory default license, and a field upgraded license. A display identity (DI) is a unique identity assigned to a device that is typically printed on a visible label on the device. Customers, e.g., typically use this identity when referring to their devices. The DI is generally bound to a specific license binding identity. The license binding identity (LBI) is a unique identity assigned to a device that is chosen for the license binding process. This means that the LBI is part of a license file that is digitally signed, such that the license can only be used on the device with this LBI. A factory default license is loaded in the factory where the device is manufactured. The factory default license is the default license file loaded on the device that contains the LBI of the device that it binds to, a set of software features entitled to the device, and a digital signature. A field upgraded license is an updated license that is requested and loaded onto a device in the field. Typically, a field upgraded license contains additional and/or upgraded features that are enabled compared to the factory default license.

Figure 1:
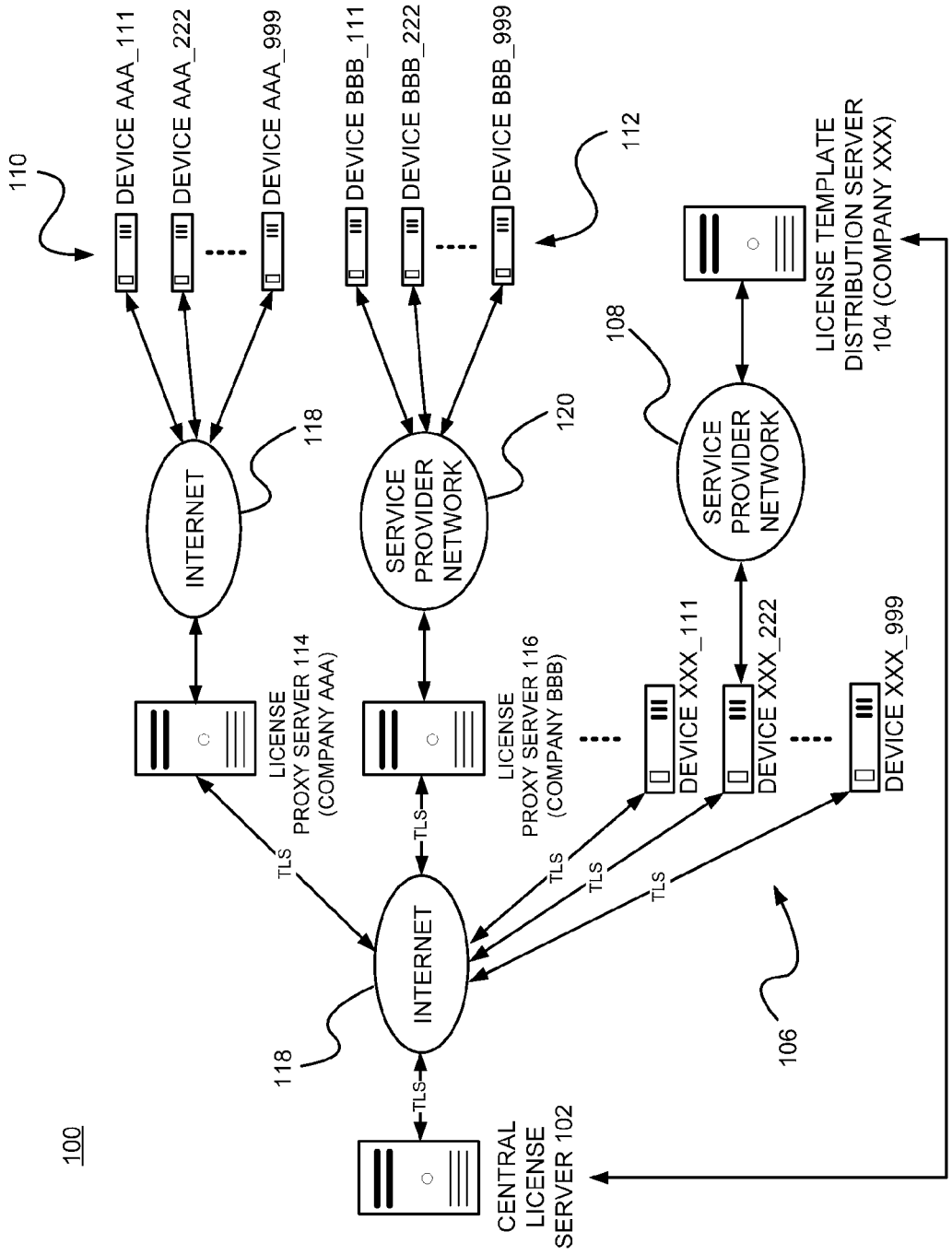
FIG. 1 is a diagram illustrating an exemplary system architecture for field license updates in accordance with one or more embodiments of the invention.

FIG. 1 shows an exemplary system architecture 100 for updating licenses for devices 106, 110, 112 in the field. A service provider/operator (e.g. Company XXX) decides to upgrade the features of its devices 106, 110, 112 (e.g. Device XXX_111 to Device XXX_999) in the field. The service provider/operator communicates this to a central license server 102 (CLS), which generates an updated license template accordingly. In one or more embodiments, the license template contains a description of the upgraded feature set and is signed for authentication purposes. A service provider/operator then loads this license template onto a license template distribution server 104 as the most current license template.

Devices 106, 110, 112 in the field communicate with the license template distribution server 104 through a service provider network 108 to check whether there are new features available. This may occur periodically or non-periodically, such as only when the devices 106, 110, 112 receive an available upgrade notification. The devices 106, 110, 112 download the current license template provided by the license template distribution server 104 and compare the feature set provided by the current license template with the feature set currently enabled on the devices 106, 110, 112. If they are different, devices 106, 110, 112 send a license request message to the central license server 102 via a respective license proxy server 114, 116 or directly with the central license server 102. In one illustrative application as shown in FIG. 1, the devices 106, 110, 122 send a license request directly to the central license 102 using a security protocol such as transport layer security (TLS).

The central license server 102 processes the request and generates a new license with the new feature set, consuming a predetermined amount of license credits belonging to the service provider/operator. The amount of license credits deducted may depend on factors such as the value of the feature. The central license server 102 may transmit the new license to the devices 106, 110, 112 directly (e.g. Device XXX_111 to Device XXX_999) or via respective license proxy servers 114, 116 through the Internet 118, using security protocols such as transport layer security (TLS) or secure sockets layer (SSL).

The devices 106, 110, 112 may access and receive the new license from their respective license proxy servers 114, 116, for example, through the Internet 118 (e.g. Device AAA_111 to Device AAA_999) or service provider network 120 (e.g. Device BBB_111 to Device BBB_999). The devices 106, 110, 112 then install the new license, which enables the new upgraded feature set on the devices 106, 110, 112.

Logical Flow

Figure 2:
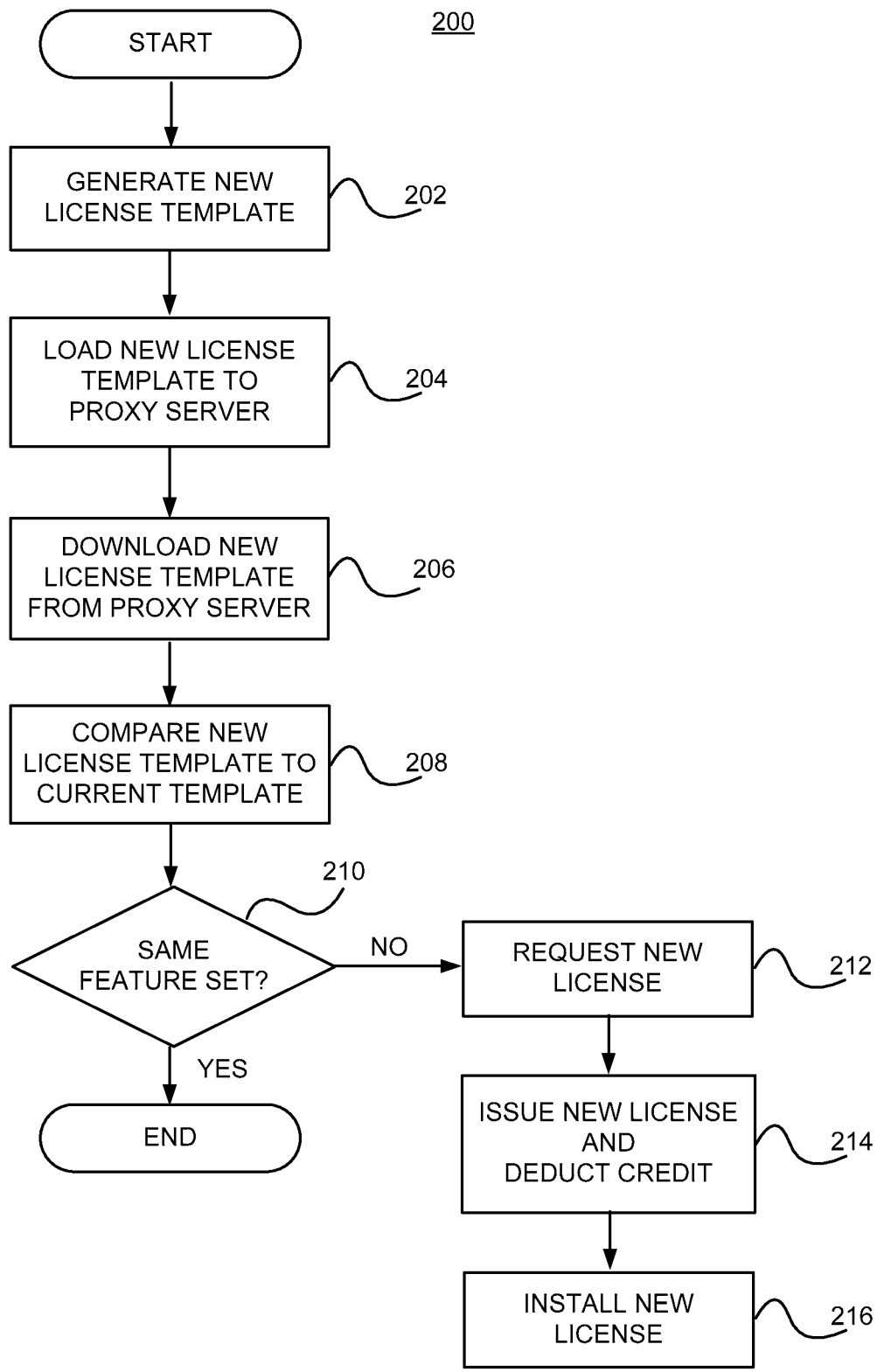
FIG. 2 is a flow chart illustrating a logical flow for upgrading features and licenses of devices in a field in accordance with one or more embodiments of the invention.

FIG. 2 is a flow chart illustrating a logical flow 200 for upgrading features and licenses of devices in a field in accordance with one or more embodiments of the invention. In block 202, a license server 102 generates a new license template which may comprise of new or upgraded features for a device. In block 204, the new license template is loaded onto a license template distribution server 104 (i.e. proxy server storing the most current license template).

In block 206, a device 106, 110, 112 in the field checks for any new license templates by downloading the license template stored on the license template distribution server 104. In block 208, the device 106, 110, 112 compares this downloaded license template to the license template currently loaded on the device 106, 110, 112.

In block 210, a determination is made whether the feature set provided by the downloaded license template is the same as the feature set provided by the license template currently loaded on the device 106, 110, 112. If the feature set is the same, the process ends and the device 106, 110, 112 takes no further action.

In block 212, if the feature set is different, the device 106, 110, 112 requests a new license from the license server 102. In block 214, the license server 102 checks the identification information of the device 106, 110, 112 and determines the license to be issued for the device 106, 110, 112. The license server 102 then issues a new license and may deduct license credits for any new or upgraded features. In block 216, the device 106, 110, 112 downloads and installs the new license, thereby enabling the feature set provided in the new license template.

Repaired/Replaced Device License Process

Software feature licensing increases the complexity in repair and replacement scenarios for a product or device. This is due to the fact that during the repair/replacement process, for example at an authorized manufacturer repair center, some components of the device may be repaired or replaced, which may impact (e.g. corrupt, delete) the software license required for enabling the set of features that were available prior to the repair/replacement of the device. This set of features may be an upgraded set that is different from the set of features enabled by the factory default license. Additionally, proper accounting of feature credit consumption and audit logs must be maintained throughout the process.

Thus, when a device is sent back for repair, it is important that the repaired/replaced device contain the same licensed feature set as before the repair. In one or more embodiments of the invention, to simplify the processing required at the repair center, the repair process employs the basic principle that in the repair center, the repaired device will only be restored to the factory default license state. That is, only the factory default license is loaded. When this repaired device is sent back to the field, the normal license update process described above will occur. This then restores the device to its most updated license state.

In one or more further embodiments, systems and methods are provided that extend existing software licensing solutions by facilitating a service operator/provider in device repair and by tracking the granted device software feature license from the repair of the device to when it is sent back to the field. By handling the various repair scenarios that occur within an existing licensing system, these systems and methods address the specific business and technical needs and requirements in issuing and maintaining device licenses. These systems and methods further add an additional secure repair capability to existing licensing systems.

Figure 3:
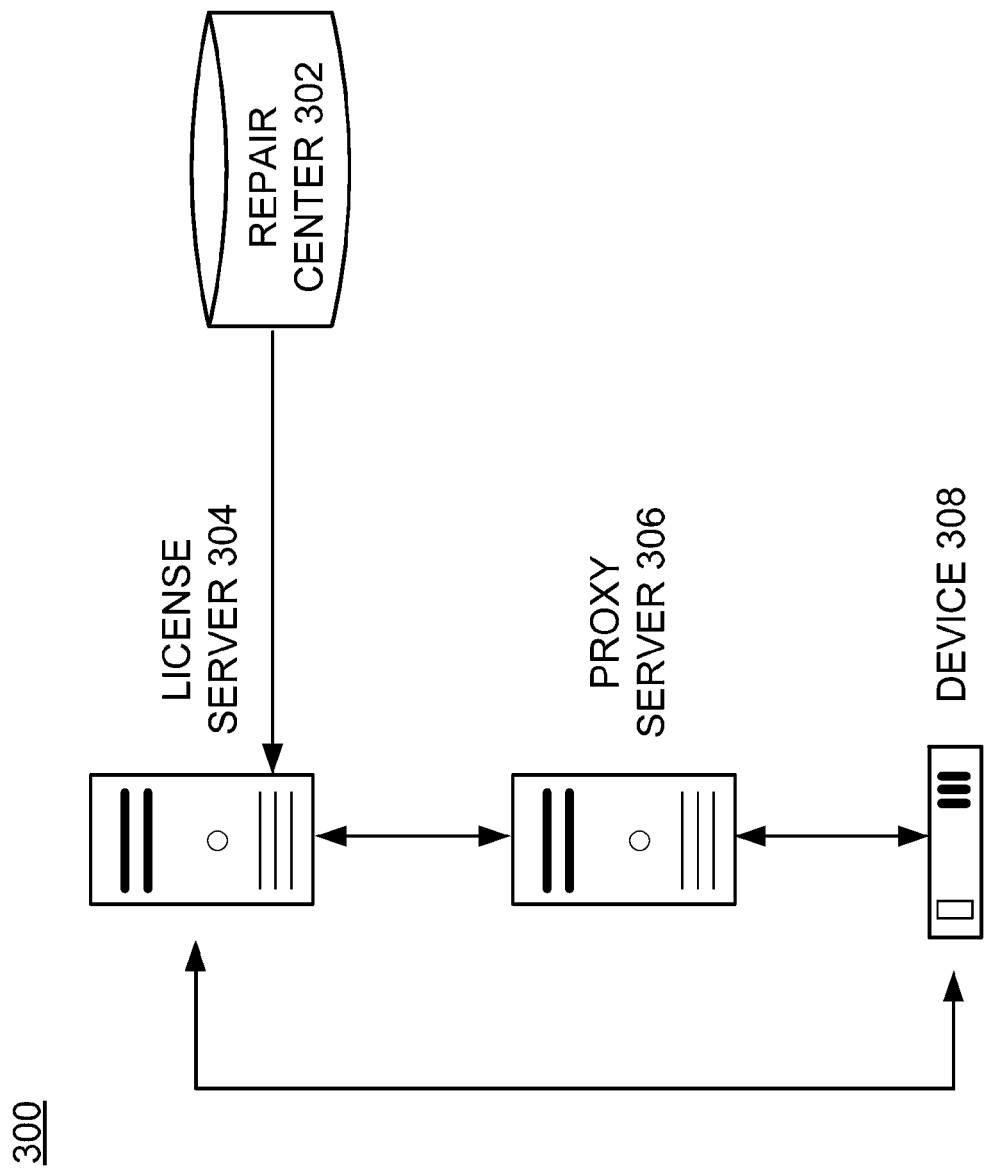
FIG. 3 is a diagram illustrating an exemplary system architecture for updating a license for a repaired or replaced device in accordance with one or more embodiment of the invention.
Figure 4:
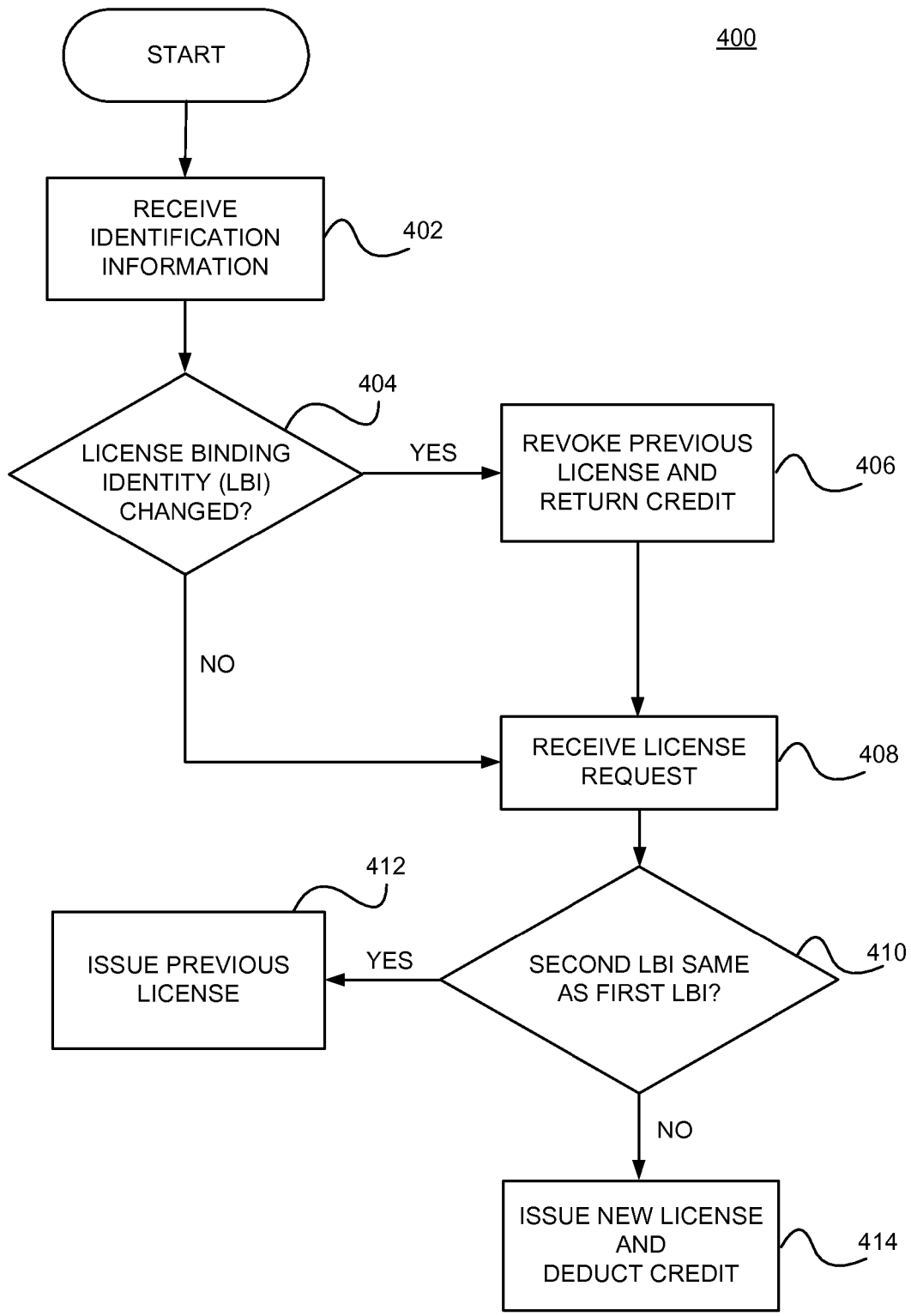
FIG. 4 is a flow chart illustrating a logical flow for issuing a license for a repaired or replaced device in accordance with one or more embodiments of the invention.
Figure 5:
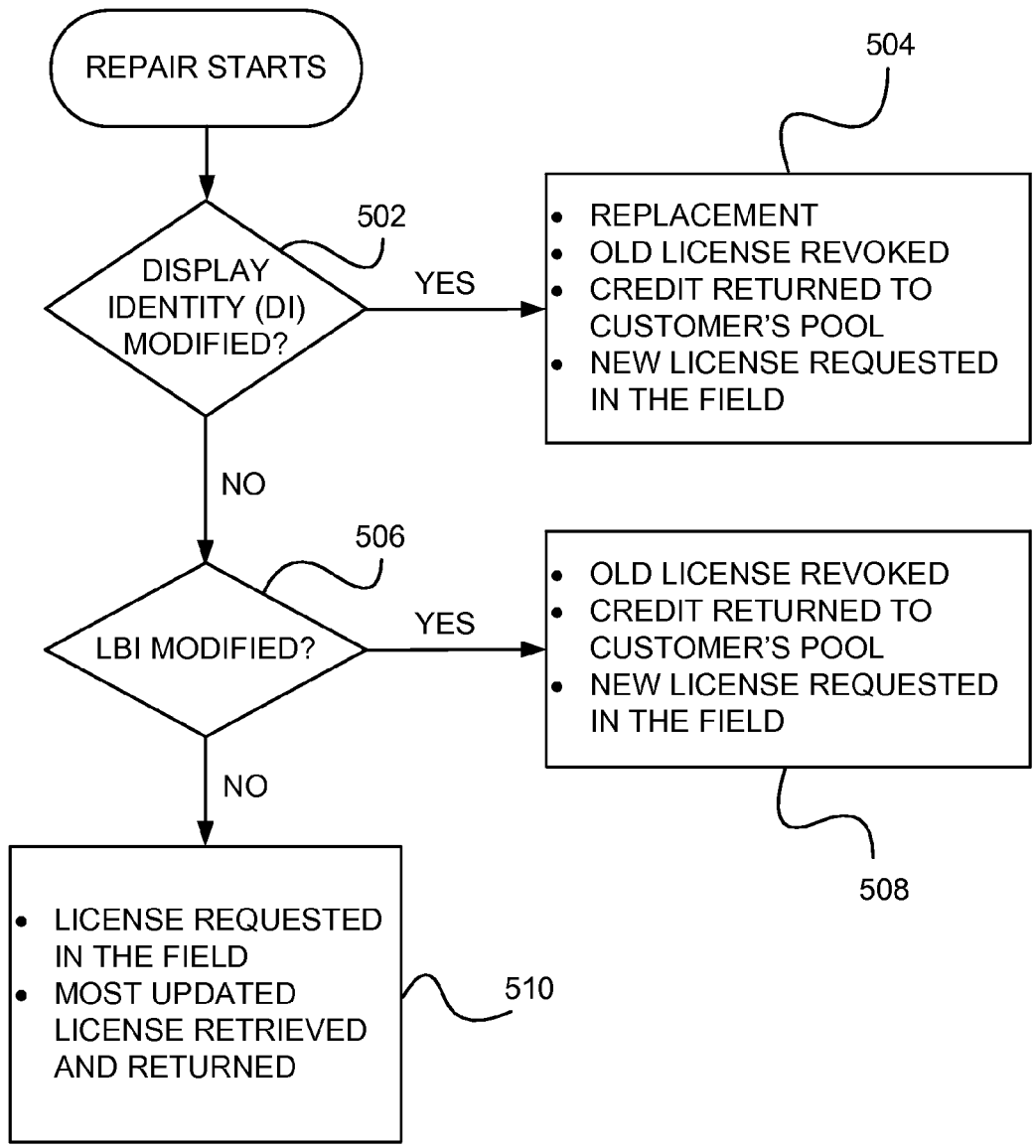
FIG. 5 is a flow chart illustrating a logical flow for various repair scenarios in accordance with one or more embodiments of the invention.

Various licensing scenarios for repaired/replaced devices may occur, depending on whether any of the license-related data and identification information on the device need to be changed. With reference to FIGS. 3-5, this is described in further detail as follows:

No Change in Both the Display Identity (DI) and License Binding Identity (LBI) of the Device In one scenario, both the display identity (DI) and license binding identity (LBI) are not changed (i.e. remain the same) when the device is repaired. However, in certain situations, the current license file on the device may be corrupted. During repair, a factory default license with possibly less features may be loaded. Once the repaired device is sent back to the field, the normal license update process described above (see FIGS. 1 and 2) will kick in. As illustrated in FIG. 3, a device 308 that has been sent back in the field communicates with a server, such as a proxy server 306, to check whether there are new features available. The device 308 downloads the current license template provided by the proxy server 306 and compares the feature set provided by the current license template with the feature set currently enabled by the factory default license on the device 308.

Assuming that the license template does not get updated between the period when the device 308 is being repaired and when it is returned back to the field, the device 308 requests a license with the same features as before from the license server 304 directly or via the proxy server 306. The license server 304 simply retrieves (from its database) and returns the current license for the device 308 (based on the LBI of the device 308). This operation does not consume any feature credits since a new license is not generated.

Note that although the above description assumes that the license template did not get updated/upgraded during the repair time period, the same process and method is still applicable in the case where it changes. If the license template changes, a new license is generated by the license server 304 with the updated feature set defined in the new license template. Any additional feature/license credit required for the update is deducted by the license server 304.

Change in the License Binding Identity (LBI) of the Device

In another scenario, the LBI is changed when the device 308 is repaired. An issue arises since a factory default license with possibly less features may be loaded onto the device 308 during its repair. A repair center database 302 which stores the identification information for the device 308, such as its DI to new LBI mapping/binding, sends the identification information to the license server 304 (e.g. periodically or whenever new identification information is generated). Since the old identification information stored in the database of the license server 304 for the device 308 comprises the DI being bound to an old LBI, the license server 304 recognizes that there is a change in the DI to LBI mapping for device 308. The license server 304 therefore revokes the license bound to the old LBI, and returns any credits back to the user's credit pool. This allows the user (e.g. service provider, operator, customer) to obtain a new license for the repaired device 308 in the field.

Once the repaired device 308 is sent back to the field, the normal license update process described above will kick in. The device 308 in the field communicates with a server, such as a proxy server 306, to check whether there are new features available. The device 308 downloads the current license template provided by the proxy server 306 and compares the feature set provided by the current license template with the feature set currently enabled by the factory default license on the device 308.

Assuming that the license template does not get updated between the period when the device 308 is being repaired and when it is returned back to the field, the device 308 requests a new license from the license server 304 directly or via the proxy server 306. The license server 304 generates a new license with the same features as before (based on the license template) but using the new LBI bound to the DI for the device 308. This operation consumes feature/license credits because a new license is generated. However, since sufficient credits were returned back to the user's credit pool when the old license was revoked, the net effect is that no additional credits are needed for the repaired device 308 to obtain a new license.

Note that although the above assumes the license template did not get updated/upgraded during the repair time period, the same process and method is still applicable in the case where it changes. If the license template changes, a new license is generated by the license server 304 with the updated feature set defined in the new license template. Even though this new license may require increased/additional license credits, the net "effective" credit consumption is only the additional credits required for the new features (i.e. the difference between credits returned when the old license is revoked and the credits deducted when the new license is issued).

Change in Both the Display Identity (DI) and LBI of the Device

A further scenario is a replacement scenario where a replacement device 308 with a different DI and LBI is sent to the customer (i.e. both the DI and LBI are changed). The repair center 302 communicates to the license server 304 that device 308 has been replaced. The license server 304 then revokes the license bound to the old DI and LBI of the device 308, returning credits back to the user's (e.g. service provider, operator, customer) credit pool.

When the replacement device 308 gets sent back to the field, the normal license update process described above will kick in. The device 308 in the field communicates with a server, such as a proxy server 306, to check whether there are new features available. The device 308 downloads the current license template provided by the proxy server 306 and compares the feature set provided by the current license template with the feature set currently enabled by the default factory license on the device 308.

Assuming that the license template does not get updated between the period when the device 308 is being repaired and when it is returned back to the field, the device 308 requests a new license from the license server 304 directly or via the proxy server 306. The license server 304 generates a new license with the same features as before (based on the license template) but using the new DI and new LBI, essentially generating a new license for a new device. This operation consumes feature/license credits because a new license is generated. However, since sufficient credits were returned back to the user's credit pool when the old license was revoked, the net effect is that no additional credits are needed for the replacement device to obtain a license.

Note that although the above assumes the license template did not change during the repair time period, the same process and method is still applicable in the case where it changes. If the license template changes, a new license is generated by the license server 304 with the updated feature set defined in the new license template. Even though this new license may require increased/additional license credits, the net "effective" credit consumption is only the additional credits required for the new features (i.e. the difference between credits returned when the old license is revoked and the credits deducted when the new license is issued).

Logical Flow

FIG. 4 is a flow chart illustrating a logical flow 400 for issuing a license for a repaired or replaced device in accordance with one or more embodiments of the invention. In block 402, a license server 304, receives identification information for a device 308. The identification information communicates to the license server if a first license binding identity (LBI) identifying the device 308 and/or a first display identity (DI) mapped to the first LBI has changed. In one exemplary application, the identification information is received from a repair center 302.

In block 404, a determination is made whether the first LBI identifying the device 308 and/or the first display identity (DI) mapped to the first LBI has changed. Typically for cases where the device 308 has been repaired, a change may be determined if a first display identity (DI) identifying the device 308 is now mapped to a different LBI as compared to the DI-to-LBI mapping stored in the license server's database. In other instances, for example when the device 308 has been replaced rather than repaired, both the first DI and the first LBI are changed.

In block 406, if the first LBI and/or first DI identifying the device 308 has changed, a previous license for the device 308 is revoked and a previous license credit is returned to a user's credit pool. In other instances, the first LBI and the first DI identifying the device 308 have not changed and the server maintains the previous license for the device 308.

In block 408, the server 304 receives a license request from the device 308 requesting a new license. The license request includes a second license binding identity (LBI) identifying the device 308 and a second display identity (DI) that is mapped to the second LBI. In certain embodiments, a license request is received from the device 308 if the previous license loaded on the device 308 is corrupted. In other embodiments, a license request is received from the device 308 if a license template that the device 308 downloads from a license proxy server contains a different set of features from that enabled by the license loaded on the device 308.

In block 410, a determination is made whether the second LBI received from the device 308 is the same as the first LBI. Based on the second DI that is submitted in the license request, the license server 304 searches for a first LBI in its database that corresponds to the second DI. This first LBI is compared to the second LBI.

In block 412, if the second LBI is the same as the first LBI, the previous license for the device 308 is issued (i.e. reissued without a deduction of license credit). The previous license may be issued directly from the license server 304 to the device 308 or to a proxy server 306 to be downloaded by the device 308. In one or more embodiments, the previous license has already been previously stored on the license proxy server 306 and the device 308 downloads the previous license from the license proxy server 306 without requiring the license server 304 to reissue the previous license.

In block 414, if the second LBI is not the same as the first LBI or a corresponding first LBI is not found (in the case of a replacement), a new license for the device 308 is issued and a new license credit is deducted from the user's credit pool. The new license may also be issued directly from the license server 304 to the device 308 or to a proxy server 306 to be downloaded by the device 308. In one or more embodiments, the license server 304 receives the license request directly from the device 308 but issues the new license through a proxy server 306 to be downloaded by the device 308. The server 304 also updates its database to reflect the new license corresponding to the new identification information (DI and LBI mapping) associated with the device 308.

The previous license enables a first set of features on the device and the new license enables a second set of features on the device. In situations where the first set of features is the same as the second set of features, the previous license credit returned to the user's credit pool is the same as the new license credit deducted from the user's credit pool. In situations where the first set of features is different from the second set of features, the previous license credit returned to the user's credit pool is different from the new license credit deducted from the user's credit pool.

FIG. 5 is another flow chart illustrating a logical flow 500 for various repair scenarios in accordance with one or more embodiments of the invention. After repairing a device 308, in block 502, a determination is made regarding whether the DI of the device 308 has been modified.

In block 504, if the DI has been modified, the identification information stored on the license server 304 is replaced. The old license for the device 308 is revoked and credit is returned to the customer's pool. A new license is later requested by the device 308 in the field.

In block 506, if the DI has not been modified, a second determination is made regarding whether the LBI of the device 308 has been modified.

In block 508, if the LBI has been modified, the old license for the device 308 is revoked and credit is returned to the customer's pool. A new license is later requested by the device 308 in the field.

In block 510, if the LBI has not been modified, a new license is later requested by the device 308 in the field. The most updated license is retrieved and returned from the license server 304.

Illustrative Implementation: Repair Center License Handling

An illustrative implementation is provided describing the license-related handling for the repair process of devices that are loaded with licensed software. FIGS. 6(A) and 6(B) show two possible configurations of the license-related components of device 600 using licensed software 612. In a first configuration, as shown in FIG. 6(A), device 600 includes a first form of non-volatile memory 610, where the licensed software 612 is loaded; and a second form of non-volatile memory 602, where the display identity 604 (DI), Public Key Infrastructure (PKI) Data 606, and factory default license 608 are stored. If there is a field-updated license 614, it is stored in the first form of non-volatile memory 610. In a second configuration, as shown in FIG. 6(B), there is only one first form of non-volatile memory 610. The DI 604, PKI Data 606, factory default license 608, licensed software 612, and optional field-updated license 614, are all stored in the same first form of non-volatile memory 610. Note that the license handling processes in a repair center for the two configurations do not differ significantly.

A license for device 600 is bound to the LBI 616 of one of its PKI Data record 606. The DI 604 is printed on the label located at the outside of the device 600. A PKI Center maintains a list of LBI 616 to DI 604 bindings that is created during the factory provisioning. This list is also imported to a Central Licensing System (CLS).

During the repair process for configuration 1, either one or both of the non-volatile memory 602, 610 may be replaced (or re-initialized). The approach for license handling in the repair center is to return device 600 to its factory license configuration. Once the repaired device 600 is put back into the field, the usual license update procedure will bring the device 600 back to its most updated license configuration. The license handling for various repair scenarios are described in further detail as follows:

No Change in the Display Identity (DI)

This accounts for all the cases where the device 600 is repairable. This is true even if the non-volatile memory 602 or 610 containing the DI 604 is replaced or re-initialized, as the original DI 604 will be loaded back to the non-volatile 602 or 610 as part of the repair process.

In configuration 1 (device 600 with both a second form of non-volatile memory 602 and a first form of non-volatile memory 610), there is no change in the LBI 616 if no repair is performed on the second form of non-volatile memory 602. The first form of non-volatile memory 610 may or may not be replaced, replaced or reinitialized. No PKI Data 606 loading and license 608 loading is required at the repair center, even if the first form of non-volatile memory 610 is replaced. If the first form of non-volatile memory 610 is replaced or reinitialized, the licensed software image 612 is reloaded onto the device 600 at the repair center. This may be done, for example, using a computer that works with the device 600 to provide diagnostic functions, including the downloading of licensed software image to the devices. The repaired device 600 is then sent back to the customer.

When put in the field, a license update process will kick in where a license proxy server delivers the current license template to the device 600. The device 600 compares the current license template with the existing license loaded on the device 600 (which may be the factory default 608 or an updated license 614 in the first form of non-volatile memory 610). If the template contains more features than the existing license, the device 600 will send a License Request message to the CLS (via the license proxy server). The CLS processes the License Request.

Note that if the license template contains the same feature set as the most recent license associated with the LBI 616 found in the database, the CLS will simply return the most recent license without the need of generating a new one. If a new license needs to be generated, the baseline for credit computation is the most recent license associated with the LBI 616.

In another case, the LBI 616 is changed due to the second form of non-volatile memory 602 being replaced or reinitialized. The first form of non-volatile memory 610 may or may not be repaired or replaced. New PKI Data 606 are loaded to the new second form of non-volatile memory 602 via a PKIS (PKI server, a factory server that provides various types of personalization and identity data to devices in the factory), hence a new LBI 616 is loaded. A factory license 608 is loaded to the device 600 via an LPS (License Personalization Server, a factory server responsible for generating a factory default license to be loaded to devices in the factory). If the first form of non-volatile memory 610 is replaced or reinitialized, the licensed software 612 image is reloaded onto the devices 600 at the repair center. This may be done, for example, using a computer.

The repaired devices 600 will have a new LBI 616 and a new factory license 608 bound to the new LBI 616. If the first form of non-volatile memory 610 is not replaced, it may contain the existing updated license 614 that is bound to the old LBI 616. The licensed software 612 handles this LBI 616 mismatch scenario in the field by requesting a new license for the new LBI 616 using the latest license template from the license proxy server.

Periodically, the PKI Center will retreive PKI 606 and LPS log data back to the CLS, for example using a data collection system. In particular, the DI 604, new LBI 616, and new factory license 608 are pulled back to the CLS. At this point, the CLS will revoke the license bound to the old LBI 616 and may return credits to the customer's credit pool (depending on business rules). If credits are returned to the customer, it may be used for generating an equivalent license for the repaired device 600 (bound to the new LBI 616). The repaired device 600 is then sent back to the customer.

When put in the field, a license update process will kick in where the license proxy server delivers the current license template to the device 600. The device 600 compares the current license template with the existing license (which in this case is the factory default license 608 that is loaded previously). If the template contains more features than the factory license 608, the device 600 will send a License Request message to the CLS (via the license proxy server). The CLS generates a new license for the new LBI 616 based on the license template in the request. It consumes/returns credits as usual. Note that if credits were returned to the customer previously, they are then used to generate this new license. As a result, no additional credits are required from the customer.

Figure 7:
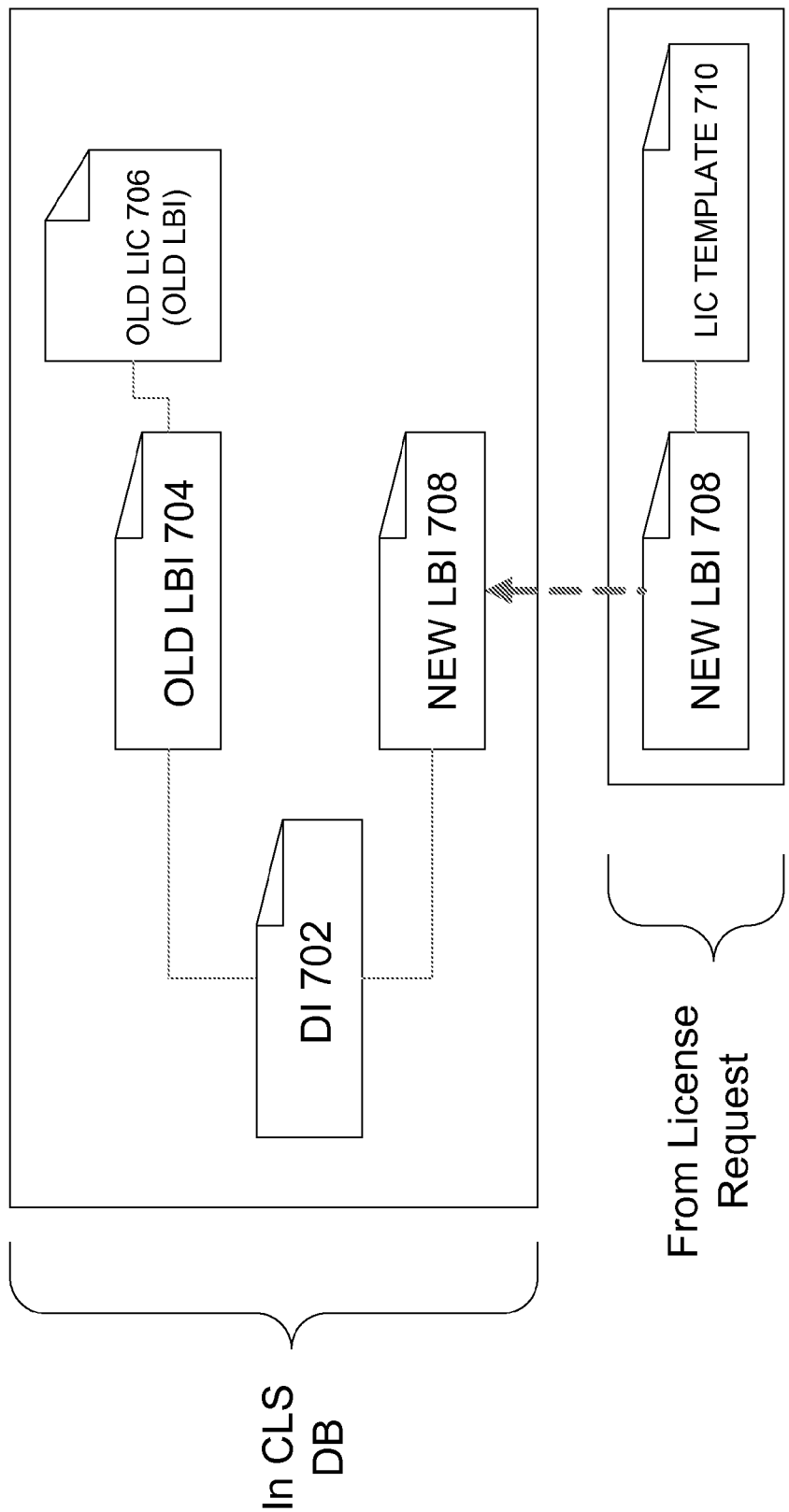
FIG. 7 is a diagram illustrating the relationship between a display identity (DI), old license binding identity (LBI), and new LBI in an exemplary implementation of the invention.

The relationship between the DI, the old and the new LBI are shown in FIG. 7. In the CLS database (CLS DB), the device's DI 702 is mapped to an old LBI 704 which corresponds to an old license 706. When a license request is submitted to the CLS, a new LBI 708 is transmitted. The CLS then generates a new license for the new LBI 708 based on the license template 710 in the request.

In Configuration 2 (device 600 with first form of non-volatile memory 610), if no repair is performed on the first form of non-volatile memory 610, the process is similar to the case where no repair is performed on the second form of non-volatile memory 602 for Configuration 1 (described above). No PKI Data 606 loading and license 608 loading is required at the repair center. The repaired device 600 is sent back to the customer.

When put in the field, a license update process will kick in to update the license if necessary. The device 600 compares the current license template with the existing license loaded on the device 600 (which may be the factory default 608 or an updated license 614). If the template contains more features than the existing license, the device 600 will send a License Request message to the CLS (via the license proxy server). The CLS processes the License Request.

Note that if the license template contains the same feature set as the most recent license associated with the LBI 616 found in the database, the CLS will simply return the most recent license without the need of generating a new one. If new license needs to be generated, the baseline for credit computation is the most recent license associated with the LBI.

In the case where the first form of non-volatile memory 610 is replaced or reinitialized, the process is similar to the case where the LBI 616 is changed due to the second form of non-volatile memory 602 being replaced or reinitialized in Configuration 1 (described above). New PKI Data 606 are loaded to the first form of non-volatile memory 610 via a PKIS, hence a new LBI 616 is loaded. A factory license 608 is loaded to the device 600 via an LPS. The licensed software 612 image is reloaded onto the device 600 at the repair center. This may be done, for example, using a computer.

The repaired device 600 will have new LBI 616 and new factory license 608 bound to the new LBI 616. Periodically, the PKI Center will retrieve PKI 606 and LPS log data back to the CLS, for example using a data collection system. In particular, the DI 604, new LBI 616, and new factory license 608 are pulled back to the CLS. The repaired device 600 will be sent back to the customer.

When put in the field, a license update process will kick in where the license proxy server delivers the current license template to the device 600. The device 600 compares the current license template with the existing license (which in this case is the factory default license 608 that is loaded previously). If the template contains more features than the factory license 608, the devices 600 will send a License Request message to the CLS (via the license proxy server). The CLS generates a new license for the new LBI 616 based on the license template in the request. It consumes/returns credits as usual. Note that if credits were returned to the customer previously, they are then used to generate this new license. As a result, no additional credits are required from the customer.

Change in the Display Identity (DI)

In this case, the device 600 is entirely replaced. Typically, a credit is provided to the customer to order a replacement device 600. In addition, the technician at the repair center needs to log in to CLS and input the DI 604 of the device 600 being replaced. To minimize human errors, it is recommended that some type of label scanner is used at the repair center to scan in the DI 604 directly to the CLS. If the first form of non-volatile memory 610 or the second form of non-volatile memory 602 from the replaced devices 600 is to be reused, they must be erased to remove any old PKI data 606 and license data. CLS will revoke the license and give credit back to the customer. The customer gets a replacement device 600, which will be loaded with the factory default license 608.

When the device 600 is put in the field, the usual license update process will kick in to generate and load any upgraded license as configured at the license proxy server. The customer will have the credit to generate a new license for the new device 600 with the same feature set as in the replaced device 600. Note that in this case, CLS will not have the linkage of the DI 604 of the replaced device 600 and that of the new device 600.

Hardware Environment

Figure 8:
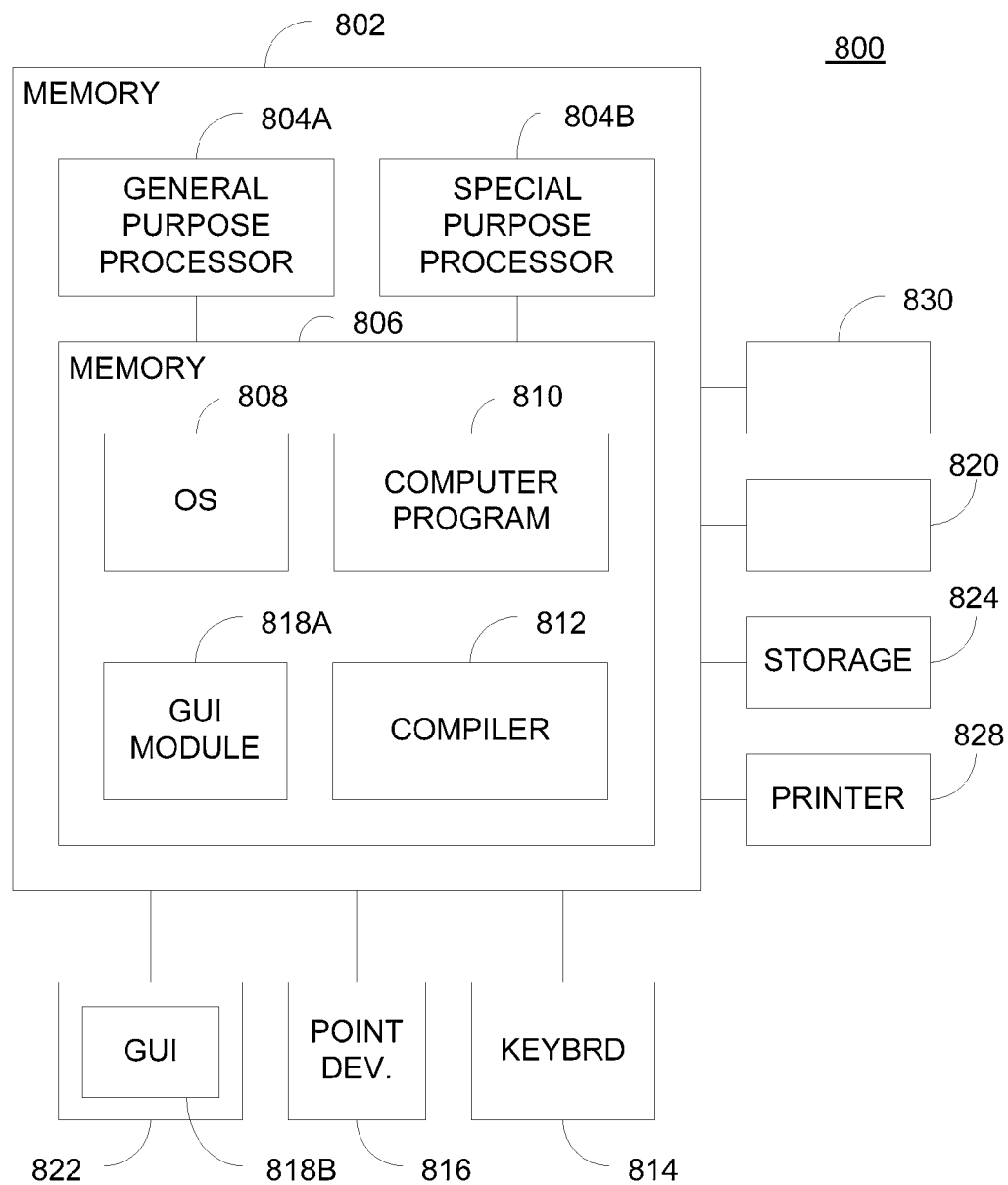
FIG. 8 is a diagram illustrating an exemplary computer system that could be used to implement elements of the present invention in accordance with one or more embodiments of the invention.

FIG. 8 is a diagram illustrating an exemplary computer system 800 that could be used to implement elements of the present invention, including the license server 304, proxy server 306, and device 308. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to other devices, including input/output (I/O) devices such as a keyboard 814, a mouse device 816 and a printer 828.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808 to provide output and results.

Output/results may be presented on the display 822 or provided to another device for presentation or further processing or action. In one embodiment, the display 822 comprises a liquid crystal display (LCD) having a plurality of separately addressable pixels formed by liquid crystals. Each pixel of the display 822 changes to an opaque or translucent state to form a part of the image on the display in response to the data or information generated by the processor 804 from the application of the instructions of the computer program 810 and/or operating system 808 to the input and commands. Other display 822 types also include picture elements that change state in order to create the image presented on the display 822. The image may be provided through a graphical user interface (GUI) module 818A. Although the GUI module 818A is depicted as a separate module, the instructions performing the GUI functions can be resident or distributed in the operating system 808, the computer program 810, or implemented with special purpose memory and processors.

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 802 may also implement a compiler 812 which allows an application program 810 written in a programming language such as COBOL, C++, FORTRAN, or other language to be translated into processor 804 readable code. After completion, the application or computer program 810 accesses and manipulates data accepted from I/O devices and stored in the memory 806 of the computer 802 using the relationships and logic that was generated using the compiler 812.

The computer 802 also optionally comprises an external communication device such as a modem, satellite link, Ethernet card, or other device for accepting input from and providing output to other computers.

In one embodiment, instructions implementing the operating system 808, the computer program 810, and/or the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, or a flash drive. Further, the operating system 808 and the computer program 810 are comprised of computer program instructions which, when accessed, read and executed by the computer 802, causes the computer 802 to perform the steps necessary to implement and/or use the present invention or to load the program of instructions into a memory, thus creating a special purpose data structure causing the computer to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 802.

Although the term "computer" is referred to herein, it is understood that the computer may include computer servers, portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for issuing a license for a device through a license server, comprising:
   receiving identification information for a device, wherein the identification information communicates to the license server if at least one of a first license binding identity identifying the device and a first display identity mapped to the first license binding identity has changed;
   revoking a previous license for the device and returning a previous license credit to a user's credit pool when at least one of the first license binding identity and the first display identity has changed;
   restoring a factory license for the device as a second license binding identity when the previous license for the device is revoked;
   receiving a license request, the license request including identification of the second license binding identity identifying the device;
   determining if the second license binding identity is the same as first license binding identity;
   issuing the previous license for the device if the second license binding identity is the same as the first license binding identity; and
   issuing a new license for the device and deducting a new license credit from the user's credit pool if the second license binding identity is not the same as the first license binding identity.

2. The method of claim 1, further comprising updating the first license binding identity with the second license binding identity when a new license is issued for the device.

3. The method of claim 1 wherein a first display identity is mapped to the first license binding identity and a second display identity is mapped to the second license binding identity.

4. The method of claim 3, wherein the new license for the device is issued and the new license credit from the user's credit pool is deducted if the second license binding identity is not the same as the first license binding identity and the second display identity is the same as the first display identity.

5. The method of claim 1, wherein when the new license for the device is issued and the new license credit from the user's credit pool is deducted the new user's net credit pool from the time the previous license credit is returned upon revocation of the previous license until the new license is issued will be zero.

6. The method of claim 1, wherein the license request is received from the device if the previous license loaded on the device is corrupted.

7. The method of claim 1, wherein the license request is received from the device if a license template that the device downloads from a license proxy server contains a different set of features from that enabled by the license loaded on the device.

8. The method of claim 1, wherein the previous license enables a first set of features on the device and the new license enables a second set of features on the device.

9. The method of claim 8, wherein the first set of features is the same as the second set of features and the previous license credit returned to the user's credit pool is the same as the new license credit deducted from the user's credit pool.

10. The method of claim 8, wherein the first set of features is different from the second set of features and the previous license credit returned to the user's credit pool is different from the new license credit deducted from the user's credit pool.

11. A system for issuing a license for a device, comprising:
    a license server comprising a first license binding identity identifying a device; and
    one or more processes performed by the license server, the processes configured to:
      receive identification information for a device, wherein the identification information communicates to the license server if at least one of a first license binding identity identifying the device and a first display identity mapped to the first license binding identity has changed;
      revoke a previous license for the device and return a previous license credit to a user's credit pool if at least one of the first license binding identity and the first display identity has changed;
      restore a factory license as a second license binding identity for the device when the previous license for the device is revoked;
      receive a license request, the license request including an identification of the second license binding identity identifying the device;
      determine if the second license binding identity is the same as first license binding identity;
      issue the previous license for the device if the second license binding identity is the same as the first license binding identity; and
      issue a new license for the device and deduct a new license credit from the user's credit pool if the second license binding identity is not the same as the first license binding identity.

12. The system of claim 11, further comprising a process configured to update the first license binding identity with the second license binding identity when a new license is issued for the device.

13. The system of claim 11 wherein a first display identity is mapped to the first license binding identity and a second display identity is mapped to the second license binding identity.

14. The system of claim 13, wherein the new license for the device is issued and the new license credit from the user's credit pool is deducted if the second license binding identity is not the same as the first license binding identity and the second display identity is the same as the first display identity.

15. The system of claim 11, wherein when the new license for the device is issued and the new license credit from the user's credit pool is deducted the new user's net credit pool from the time the previous license credit is returned upon revocation of the previous license until the new license is issued will be zero.

16. The system of claim 11, wherein the license request is received from the device if the previous license loaded on the device is corrupted.

17. The system of claim 11, wherein the license request is received from the device if a license template that the device downloads from a license proxy server contains a different set of features from that enabled by the license loaded on the device.

18. The system of claim 11, wherein the previous license enables a first set of features on the device and the new license enables a second set of features on the device.

19. The system of claim 18, wherein the first set of features is the same as the second set of features and the previous license credit returned to the user's credit pool is the same as the new license credit deducted from the user's credit pool.

20. The system of claim 18, wherein the first set of features is different from the second set of features and the previous license credit returned to the user's credit pool is different from the new license credit deducted from the user's credit pool.

\* \* \* \* \*